United States Patent [19]
Coffinberry

[11] 4,104,873
[45] Aug. 8, 1978

[54] FUEL DELIVERY SYSTEM INCLUDING HEAT EXCHANGER MEANS

[75] Inventor: George A. Coffinberry, Cincinnati, Ohio

[73] Assignee: The United States of America as represented by the Administrator of the United States National Aeronautics and Space Administration, Washington, D.C.

[21] Appl. No.: 745,766

[22] Filed: Nov. 29, 1976

[51] Int. Cl.² .............................................. F02C 9/06
[52] U.S. Cl. .............................. 60/39.28 R; 60/39.08; 60/39.66
[58] Field of Search .................... 60/39.28 R, 39.28 T, 60/39.08, 39.66

[56] References Cited
U.S. PATENT DOCUMENTS

| | | | |
|---|---|---|---|
| 2,907,527 | 10/1959 | Cummings | 60/39.08 |
| 2,916,875 | 12/1959 | Morley | 60/39.08 X |
| 3,080,716 | 3/1963 | Cummings | 60/39.66 |
| 3,300,965 | 1/1967 | Sherlaw | 60/39.08 |
| 3,420,055 | 1/1969 | Lavash | 60/39.28 R |
| 3,779,007 | 12/1973 | Lavash | 60/39.28 R |
| 4,041,697 | 8/1977 | Coffinberry | 60/39.66 |

*Primary Examiner*—Clarence R. Gordon
*Attorney, Agent, or Firm*—Henry J. Policinski; Derek P. Lawrence; Norman T. Musial

[57] ABSTRACT

A fuel delivery system is presented wherein first and second heat exchanger means are each adapted to provide the transfer of heat between the fuel and a second fluid such as lubricating oil associated with the gas turbine engine. Valve means are included which are operative in a first mode to provide for flow of the second fluid through both first and second heat exchanger means and further operative in a second mode for bypassing the second fluid around the second heat exchanger means.

15 Claims, 1 Drawing Figure

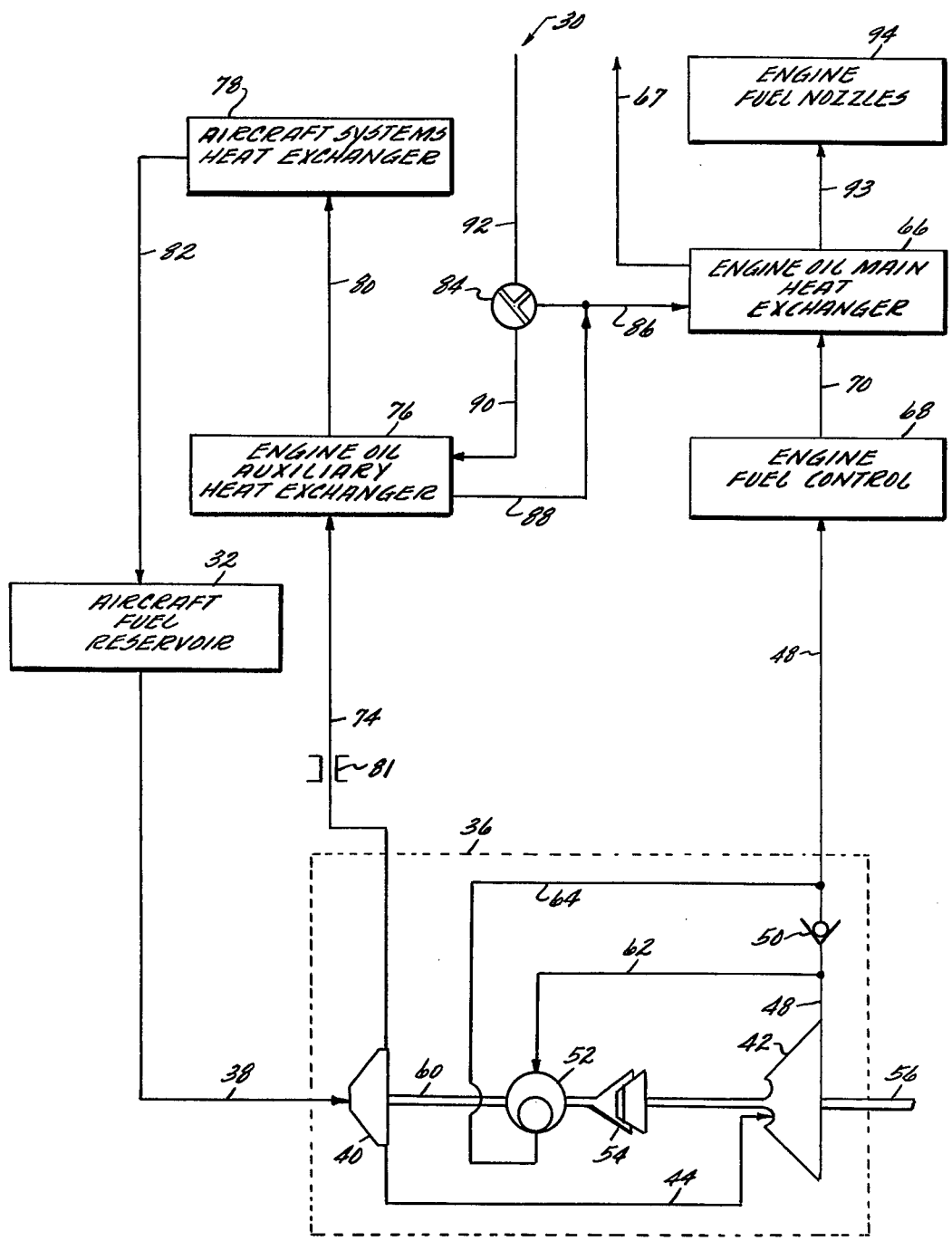

FUEL DELIVERY SYSTEM INCLUDING HEAT EXCHANGER MEANS

BACKGROUND OF THE INVENTION

This invention relates to a fuel delivery system associated with an aircraft gas turbine engine and, more particularly, to a fuel delivery system which includes heat exchanger means for maintaining the temperature of the fuel and engine oil below limits which if exceeded would reduce the life and reliability of fuel and oil system components.

The invention herein described was made in the performance of work under a NASA contract and is subject to the provisions of Section 305 of the National Aeronautics and Space Act of 1958, Public Law 85 – 568 (72 Stat. 435; 42 USC 2457).

It is well known in the art to associate heat exchangers with gas turbine engine fuel delivery systems to provide for heat transfer from a hot fluid, such as oil from the engine lubrication system, to the relatively cool pressurized fuel delivered by the fuel delivery system to the engine fuel nozzles. The cooled engine oil is then better adapted to lubricate various selected components of the gas turbine engine. However, in certain fuel delivery systems under certain conditions, the effectiveness of such heat exchangers may have a deleterious effect upon the other engine components. Typically these adverse effects are encountered at specific points in the operating cycle of the gas turbine engine when the fuel, passing through the fuel pump associated with the fuel delivery system, exhibits a high temperature rise. When additional heat is transferred from the oil to the fuel in the heat exchanger, the high temperature of the fuel delivered to the engine fuel nozzles may result in gumming and coking of critical clearances and orifices associated with proper flow distribution in the engine combustors. Since the oil cannot be cooled to a temperature lower than the temperature of the fuel exiting the pump, the oil leaves the heat exchanger at a high temperature. The hot oil is then poorly adapted for lubricating the aforementioned selected engine components. The fuel delivery system described in a copending U.S. patent application Ser. No. 634,452 filed Nov. 24, 1975 is one fuel delivery system in which high fuel temperature rise may be encountered under certain engine operating conditions. The fuel delivery system described in this referenced application is comprised of a boost pump element in serial flow relationship with a primary centrifugal pump. Fuel is initially pressurized by the boost pump element, then additionally pressurized by the primary pump for delivery to the engine fuel control. The primary pump is drivingly connected to a power source, such as a gearbox drive assembly, while the boost pump element is selectively driven by a fluid motor under engine operating conditions and by the same power source as the primary pump under engine start-up and shutdown conditions.

The boost pump element and the primary pump are primarily designed for high flow and high pressure rise requirements of the engine at take-off power settings. At these high power settings, the temperature rise of the fuel through the delivery system is not significant since the thermal absorption capacity due to the high flow rate of the fuel is sufficient to absorb heat generated by inefficiencies of the system. Hence at high power settings, the fuel emerging from the delivery system may be appropriately passed through a heat exchanger and used to cool another fluid such as oil from the engine lubrication system. However, under engine start-up and shutdown conditions, which may exist for prolonged periods of time, the fuel demand of the engine fuel control is substantially less than the fuel demand at a take-off power setting. At the same time, the boost pump element is driven in an over-speed condition due to the direct drive connection with the primary pump power source. The boost pump over-speed condition and the low fuel flow rate through the boost pump under engine start-up and shutdown lead to an excessive fuel temperature rise across the booster pump element.

The temperature rise of the fuel across the fuel delivery system is also increased by the poor efficiency of the primary pump at low flow rates. The poor efficiency and associated temperature rise occur because the primary pump, which is designed and sized for high flow rates, is grossly oversized at low flow rates. The primary pump diffuser and blade configuration also tend to be mismatched at low flow rates. Consequently the primary pump generates significant heat which causes a temperature rise in the fuel which is excessive. The fuel is then subsequently passed through a heat exchanger encountering a further rise in temperature as the result of the transfer of heat from the oil. The hot fuel nozzles may be affected as previously described by the excessive temperature of the fuel and the hot engine oil may cause premature failure of the lubricated components of the engine.

Therefore it is an object of the present invention to provide an improved fuel delivery system wherein the temperature of the fuel delivered to the engine fuel nozzles is maintained sufficiently low so as not to deleteriously affect the flow distribution of the combustor nozzles.

It is a further object of the present invention to provide a fuel delivery system including heat exchanger means wherein the transfer of heat between the fuel and oil in the heat exchanger will prevent oil being delivered to the engine lubrication at an excessive temperature.

These and other objects, which will become apparent from the following specification and appended drawings, are accomplished by the present invention, which briefly stated in one form, provides a fuel delivery system associated with a gas turbine engine wherein the system includes a fuel supply reservoir supplying fuel to pump means which pressurize the fuel for delivery to engine fuel nozzles through a first fluid passage providing fluid communication between a first fluid outlet in the pump means and the nozzles. A second fluid passage is included for providing for return flow of the fuel from a second fluid outlet in the pump means to the supply reservoir. First heat exchanger means are operatively associated with the first fluid passage for providing for the transfer of heat between fuel flowing in the first passage and a second fluid. Second heat exchanger means are operatively associated with the second fluid passage for providing for the transfer of heat between fuel flowing in the second passage and the second fluid. Valve means are operative in a first mode to provide for flow of the second fluid through the second heat exchanger and further operative in a second mode for bypassing the second fluid around the second heat exchanger. The valve means are operative in the first mode when the pump means delivers fuel to the engine fuel nozzles at a low rate of fuel flow. The valve means are operative in the second mode when the fuel is delivered at a high rate of fuel flow.

BRIEF DESCRIPTION OF THE DRAWING

While the specification concludes with claims particularly pointing out and distinctly claiming the invention described herein, it is believed that the invention will be more readily understood by reference to the following description and the accompanying drawing in which:

The FIGURE is a schematic representation of the fuel delivery system including heat exchanger and valve means comprising the present invention.

DESCRIPTION OF A PREFERRED EMBODIMENT

Referring to the FIGURE, a schematic representation of the fuel delivery and control system, designated generally at 30, is depicted and includes a fuel reservoir 32, typically an aircraft fuel tank, which supplies gas turbine engine fuel to a pump system, depicted generally by dotted line 36, via fluid conduit 38. Pump system 36 includes a boost pump element 40 which initially pressurizes fuel received from fuel reservoir 32 and a primary pump element 42 which receives the initially pressurized fuel from boost element 40 through fluid conduit 44. Primary pump 42 further pressurizes the engine fuel for delivery to a pump outlet conduit 48 which includes check valve 50 disposed therein for purposes hereinafter to be described.

Pump system 36 further includes a dynamic machine 52 and a clutch 54, the latter being disposed upon a drive shaft 56 connected to a source of power (not shown) such as the main engine gearbox drive assembly. Clutch 54 is adapted to selectively couple dynamic machine 52 to shaft 56 and thereby to also operatively provide power to boost pump 40, which is coupled to dynamic machine 52 by connecting shaft 60, from drive shaft 56. Dynamic machine 52 serves as a fluid pump during low speed operation such as that characterized during starting and shutdown of the gas turbine engine. Under low speed operation, clutch 54 is engaged such that dynamic machine 52 and boost pump 40 are operatively driven by drive shaft 56 which also drives primary pump 42. Under low speed operation, the pressure output of primary pump 42 is very low. For example, since the pressure delivery is a function of pump rotational speed squared, if the pump is rotating at 10% of its design speed the pressure output is only 1% of its design value, which is an insignificant pressure rise incapable of sustaining ignition of a gas turbine engine. Accordingly, dynamic machine 52 is maintained in an engaged relationship with primary pump 42 and shaft 56 through clutch 54 to act as a pump. In its pumping mode, dynamic machine 52 does necessary work on fuel received from outlet conduit 48 via fluid conduit 62 to increase the pressure of the fuel to a level sufficient to sustain the continued operation of the gas turbine engine. Fluid flowing through dynamic machine 52 is returned to conduit 48 at a point downstream of check valve 50 via return fluid conduit 64. Check valve 50 prevents fluid from flowing back to primary pump 42 under low speed operation.

As the system shaft speed increases, the output pressure of the primary pump 42 increases. At a predetermined pressure level, clutch 54 is disengaged (by means not shown) whereby dynamic machine 52 acts as a motor, extracting energy from the fluid flowing therethrough to drive boost pump 40 via connecting shaft 60.

A more complete understanding of the operation of the pumping system 36 may be more readily obtained from a reading of aforementioned copending patent application.

Fuel exiting pump system 36 is directed via conduit 48 to engine fuel control 68 and thence is received by heat exchanger 66 via conduit 70. Heat exchanger 66 also receives oil from a typical engine oil scavenge sump system (not shown) via oil conduits 92, 86 and valve 84. Heat exchanger 66 is adapted to provide for the transfer of heat between the oil and the fuel in conduit 70. Fuel exits heat exchanger 66 via fluid conduit 93 for distribution to the engine fuel nozzles 94.

A second fuel outlet conduit 74 from pump system 36 is provided by the present invention. Conduit 74 is disposed so as to fluidly connect boost pump element 40 with an auxiliary heat exchanger 76. It is observed that heat exchangers 66 and 76 are disposed in a parallel fluid receiving relationship with pump system 36. Fuel exiting heat exchanger 76 passes through an aircraft system's heat exchanger 78 via fluid conduit 80 and thence is returned to fuel reservoir 32 via fluid conduit 82. It is observed that a fluid loop or circuit has been provided in the present invention wherein a portion of the fuel received from fuel reservoir is pressurized by boost pump 40 and returned to the reservoir via a flow path comprised of outlet conduits 74, 80 and 82. This aforementioned fluid circuit is instrumental in reducing the boost pump 40 temperature rise by permitting a high fluid flow rate through the boost pump 40 when it is operating at an over-speed and normally low flow condition such as that encountered during engine start-up and shutdown. More specifically, with incorporation of the aforementioned fluid circuit boost pump element 40 may be designed to operate at a higher flow rate with the increased fuel flow being returned eventually to the aircraft fuel reservoir. A restriction 81 may be provided to control the rate of flow out of boost pump 40 via conduit 74. Two advantages are realized by providing the fluid circuit loop as described. First, the temperature rise across the boost pump 40 and hence the temperature rise of the fuel delivered to the primary pumping means is significantly reduced. Secondly, the fuel in the circuit loop having been passed through only a portion of the pump system 36, namely that portion comprised of boost pump 40, has not encountered any significant temperature rise and hence is well adapted for passage through appropriately disposed heat exchangers to cool other engine or aircraft fluid systems.

Another aspect of the present invention will be appreciated by directing attention to valve 84 in fluid communication with heat exchanger 66 via fluid conduit 86. Valve 84 is adapted to selectively pass oil received via conduit 92, from the engine oil scavenge system (not shown) to heat exchanger 66 either in a first mode wherein the oil is first passed to auxiliary heat exchanger 76 via conduit 90 and thence to heat exchanger 66 via conduits 88 and 86 or in a second or bypass mode wherein the oil from the engine lubrication system is passed directly to heat exchanger 66 via conduit 86 in a manner bypassing auxiliary heat exchanger 76.

Under engine operating conditions wherein engine fuel control 68 is required to deliver fuel to the gas turbine engine at a high flow rate, the flow rate of fuel through pumping system 36 is such that very little temperature rise is encountered by the fuel. Under such circumstances, the fuel is well adapted to cool the oil flowing into heat exchanger 66 such that the oil may efficiently perform its lubricating function. The fuel, even after absorbing heat from the oil, is still at a sufficiently low temperature so as not to detrimentally affect the engine fuel nozzles 94. In such high fuel flow rate operating conditions the valve 84 is disposed in the aforementioned bypass mode wherein oil enters main fuel-oil heat exchanger 66 directly from the oil scavenge system.

Under engine operating conditions wherein the fuel control 68 requirements demand a low fuel flow rate, the fuel exiting pumping system 36 may be at an excessively high temperature as a result of the temperature rise caused by the inefficiencies associated with primary pump 42. Under such circumstances the temperature of the fuel leaving pumping system 36 and entering main heat exchanger 66 may be higher than the temperature of the oil entering heat exchanger 66. By way of example it has been found that the temperature of the fuel entering heat exchanger 66 may be approximately 360° F under a particular low flow condition whereas the scavenge oil temperature at the same condition may be 335° F. Under such circumstances, heat is transferred from the fuel to the oil, thus cooling the fuel and ensuring that the fuel temperature is compatible with the reliable operation of the engine fuel nozzles 94. In order to accomplish optimum cooling of the fuel without raising the temperature of the oil above critical temperature limits, valve 84 is disposed in the aforementioned first mode of operation wherein the oil is first passed through the auxiliary heat exchanger 76 via conduit 90 where it is cooled by the fuel flowing in conduit 74 connected to the outlet of the boost pump 40. The cooled oil is subsequently passed to heat exchanger 66 via conduits 88 and 86 where heat may be transferred from the fuel to the oil. Since the oil has been precooled in heat exchanger 76, the transfer of heat to the oil in heat exchanger 66 does not raise the temperature of the oil above critical limits where the lubricating efficiency of the oil is affected.

A significant feature of the present invention may be appreciated by observing that hot oil is passed through auxiliary heat exchanger 76 only under selected conditions where it is necessary to precool the oil in order to subsequently cool fuel being delivered to the combustor fuel nozzles. During this period of time, the heat removed from the oil in heat exchanger 76 is transferred to fuel which is returned to the aircraft fuel reservoir 32. In order to avoid unnecessary heating of fuel in reservoir 32, valve 84 is operative to bypass oil around heat exchanger 76 under those conditions where it is not necessary to precool the oil. Consequently heat carried by the oil is ultimately transferred to the fuel reservoir 32 only during brief durations of time. This feature also permits fuel from the boost pump element 40 to effectively cool fluids associated with various aircraft systems. That is to say, under normal operating conditions where oil is not precooled in heat exchanger 76, fuel flowing through heat exchanger 78 is well adapted to absorb heat from the aircraft systems. Only under selective conditions, where it is necessary to precool the scavenge oil, will the temperature of the fuel delivered to heat exchanger 78 be increased and the absorption of heat from the aircraft systems somewhat reduced.

Valve 84 may be an electrical-mechanical or hydraulic-mechanical mechanism and may be operative between said first or second modes in response to signals indicative of the operating condition of the gas turbine engine such as pressure or temperature conditions. By way of example, valve 84 may be operative in response to a signal indicative of the temperature of the fuel downstream of primary pump 42 or of the temperature of the oil downstream of heat exchanger 66 or may even be responsive to a signal indicative of both temperatures. Additionally, valve 84 may be responsive to the pressure or flow rate conditions exhibited in primary pump 42 or may be responsive to an electrical signal received from the engine fuel control 68 and generated as a function of engine operating parameters such as fuel flow, engine speed, fuel temperature or fuel pressure.

From the foregoing it is now apparent that a fuel delivery system including heat exchanger means has been provided which is well adapted to fulfill the aforestated objects of the present invention and though only a single embodiment of the invention has been described for purposes of illustration, it will be apparent that other equivalent forms of the invention are possible within the scope of the appended claims. By way of example, it should be recognized that by providing for precooling of the oil not only under start-up and shutdown conditions but also under idle and low power settings, the amount of heat transferred from the oil to the fuel in heat exchanger 66 may be reduced such that the fuel is then delivered to the engine fuel nozzles at a lower temperature at these low power settings.

Having thus described the invention, what is claimed as new and useful and desired to be secured by U.S. Letters Patent is:

1. In a fuel delivery system associated with a gas turbine engine, the improvement comprising:
   a fuel supply reservoir;
   pump means for delivering pressurized fuel to engine fuel nozzles through a first fluid passage providing fluid communication between a first fluid outlet in said pump means and said nozzles;
   a second fluid passage providing for return flow of said fuel from a second fluid outlet in said pump means to said supply reservoir;
   first heat exchanger means operatively associated with said first fluid passage for providing for the transfer of heat between fuel flowing in said first passage and a second fluid;
   second heat exchanger means operatively associated with said second fluid passage and adapted to provide for the transfer of heat between fuel flowing in said second passage and said second fluid; and
   valve means operative in a first mode to provide for flow of said second fluid through said second heat exchanger means and in a second mode for bypassing said second fluid around said second heat exchanger.

2. The invention as set forth in claim 1 wherein said valve means is operative in said first mode when said pump means delivers fuel to said engine fuel nozzles at a low rate of fuel flow.

3. The invention as set forth in claim 2 wherein said valve means is operative in said second mode when said pump means delivers fuel to said engine fuel nozzles at a high rate of fuel flow.

4. The invention as set forth in claim 1 wherein said valve means is operative in said first mode when the rate of fuel flow through said pump means is less than a predetermined flow rate.

5. The invention as set forth in claim 4 wherein said valve means is operative in said second mode when the rate of fuel flow through said pump means is greater than said predetermined flow rate.

6. The invention as set forth in claim 1 wherein said valve means is disposed in a third fluid passage providing fluid communication between said first heat exchanger means and said second heat exchanger means for flow of said second fluid selectively therebetween.

7. The invention as set forth in claim 6 wherein said valve means is operative between said first and second modes in response to a signal indicative of fuel pressure.

8. The invention as set forth in claim 6 wherein said valve means is operative between said first and second modes in response to a signal indicative of fuel temperature.

9. The invention as set forth in claim 6 wherein said valve means is operative between said first and second modes in response to a signal from the engine fuel control wherein said signal is electrically generated as a function of engine operating parameters.

10. The invention as set forth in claim 6 wherein said valve means is operative between said first and second modes in response to a signal indicative of the temperature of said second fluid.

11. In a fuel delivery system associated with a gas turbine engine, said system comprising:
a fluid reservoir containing a first fluid
a boost pump in fluid receiving relationship with said fluid reservoir, said boost pump initially pressurizing said first fluid;
a primary pump in fluid communication with said boost pump, said primary pump receiving a first portion of said initially pressurized fluid and further pressurizing said first fluid;
an engine fuel control in fluid communication with said primary pump, said fuel control receiving said further pressurized fuel from said primary pump;
a fluid circuit providing fluid communication between said boost pump and said fluid reservoir for return of a second portion of said initially pressurized fluid to said fluid reservoir;
a first heat exchanger in fluid communication with said fuel control, said first heat exchanger providing for heat transfer between said further pressurized fuel and a second fluid;
a second heat exchanger disposed within said fluid circuit, said second heat exchanger providing for heat transfer between said second portion of fluid and said second fluid;
a fluid valve operative in a first mode to provide for flow of said second fluid through said second heat exchanger and in a second mode for bypassing said second fluid around said second heat exchanger.

12. In a fluid delivery system associated with a gas turbine engine, the improvement comprising:
a fluid supply reservoir;
pump means for pressurizing a first fluid received from said first reservoir;
a pair of heat exchangers disposed in a parallel fluid receiving relationship with said pump means and receiving first fluid discharged therefrom;
valve means operative in a first mode for providing flow of a second fluid through one heat exchanger of said pair and in a second mode for bypassing said one heat exchanger.

13. The invention as set forth in claim 12 wherein said valve means is operative in said first mode for providing flow of said second fluid through said pair of heat exchangers when the flow of said first fluid through said pump means is at a low rate of flow.

14. The invention as set forth in claim 13 wherein said valve means is operative in said second mode when the flow of said first fluid through said pump means is at a high rate of flow.

15. The invention as set forth in claim 12 wherein said valve means is operative between said first and second modes in response to a signal indicative of an operating condition of said gas turbine engine.

* * * * *